United States Patent

Bou et al.

[11] Patent Number: 6,045,915
[45] Date of Patent: Apr. 4, 2000

[54] ACTIVE COMPOSITE HAVING A LAMINATE STRUCTURE COMPRISING AN ACTIVE AGENT IN THE FORM OF GRANULES

[75] Inventors: Pierre Bou, Soisy sur Montmorency; Jean Jacques Guilleminot, Bures sur Yvette; Michel Pons, Paris, all of France

[73] Assignee: Elf Aquitaine, France

[21] Appl. No.: 08/954,828

[22] Filed: Oct. 21, 1997

[30] Foreign Application Priority Data

Oct. 21, 1996 [FR] France .................................... 96 12762

[51] Int. Cl.⁷ ............................... B32B 9/00; C01B 31/04
[52] U.S. Cl. ....................... 428/408; 428/402; 428/312.2; 428/131; 428/137; 428/138; 423/448
[58] Field of Search ..................... 428/408, 402, 428/332, 304.4, 312.2, 318.4, 218, 131, 137, 138; 423/445 R, 448

[56] References Cited

U.S. PATENT DOCUMENTS

| | | | |
|---|---|---|---|
| 4,906,258 | 3/1990 | Balat et al. ................................. | 55/74 |
| 5,086,022 | 2/1992 | Roca et al. ................................. | 502/60 |
| 5,554,348 | 9/1996 | Bauer . | |
| 5,569,534 | 10/1996 | Lambotte et al. ....................... | 428/402 |
| 5,861,207 | 1/1999 | Bou et al. . | |

FOREIGN PATENT DOCUMENTS 735 123  10/1996  European Pat. Off. ........... B01J 8/00

OTHER PUBLICATIONS

U.S. application No. 08/621,191, Bou et al., filed Mar. 21, 1996.

*Primary Examiner*—Deborah Jones
*Assistant Examiner*—Jason Savage
*Attorney, Agent, or Firm*—Bacon & Thomas, PLLC

[57] ABSTRACT

An active composite, consisting of a compressed support and of at least one agent that is active with respect to a gas, the compressed support comprising recompressed expanded graphite having a relative density of between 0.02 and 1.5, is formed from a series of sheets superposed on top of one another. According to the invention, the active agent is dispersed between the sheets in the form of granules.

16 Claims, 2 Drawing Sheets

6,045,915

ACTIVE COMPOSITE HAVING A LAMINATE STRUCTURE COMPRISING AN ACTIVE AGENT IN THE FORM OF GRANULES

BACKGROUND OF THE INVENTION

1. Field of the Invention

The present invention relates to an active composite having a laminate structure, consisting of a compressed support in the form of sheets and of an agent that is active with respect to a gas, the active agent being dispersed between the sheets in the form of granules.

The present invention also relates to a method of implementing gas-solid or gas-liquid physico-chemical processes using an active composite of this type as a reaction medium.

2. Description of Related Art

In certain fields such as, for example, that of chemical heat pumps based on the endothermicity or exothermicity of the reaction between a solid and a gas, or of the adsorption of a gas on a solid, a mixture of a divided material, such as expanded graphite, and of a solid reactant, for example a salt, or an adsorbent, such as a zeolite, is used. The mixture of expanded graphite and this solid, the site of a chemical reaction or of a physical adsorption, has many advantages during a chemical reaction or a physical adsorption between the solid and a gas. Expanded graphite, being in the form of sheets or of laminate particles, has a very large specific surface area and allows diffusion of the gas even in a confined medium.

The substantial improvement in the reversible solid-gas reaction kinetics which is observed, as resulting from the mixture of the active solid and natural graphite expanded by thermal means, in given mass proportions, and compacted in a fixed volume, results from an excellent permeability of the fixed bed prepared in this way to the reactive gas and from a thermal conductivity accompanied by a good coefficient of heat exchange with the walls. Conventionally, the preparation of such a reactant leads to an essentially homogeneous anisotropic bed whose anisotropic conductivity has values ranging from 0.5 to 2 $Wm^{-1}K^{-1}$ depending on the conditions of preparation (proportion and compacting) and whose coefficient of exchange with the walls lies between 50 and 150 $Wm^{-2}K^{-1}$.

Despite these advantages, the use of such mixtures in the granular state has drawbacks because of the difficulty involved in obtaining genuinely homogeneous mixtures, because of the difficulty involved in handling them and because of the large volume they occupy. In addition, the reactant, which is often hygroscopic, tends to absorb moisture if the mixing operation is a long one; a subsequent dehydration step is lengthy, and indeed expensive, and may affect the quality of the end-product, even after dehydration.

Document WO91/15292 describes an active composite in the form of a block, which comprises recompressed expanded graphite, which is subsequently impregnated with an active agent, for example a salt. This type of active composite has major advantages compared with the powder mixtures containing expanded graphite which are described above, but it may nevertheless be difficult to produce since, when the block is impregnated with a liquid, it may take a long time to dry out the block.

The methods of manufacturing expanded graphite are well known, in particular from U.S. Pat. No. 3,404,061. These methods, called graphite exfoliation methods, include a step in which a graphitic complex is rapidly expanded by heating, producing a powder of vermicular expanded graphite.

Document FR-A-2,732,242 describes an active composite formed by a series of compressed-graphite sheets superposed on top of one another, an active agent being dispersed within the sheets. Typically, during the manufacture of this type of composite, the sheets are immersed in a solution of the active agent, then dried afterwards.

Document FR-A-2,715,081 discloses a reactant, for thermochemical systems, in the form of granules. Each granule comprises a support formed by recompressed expanded natural graphite which is impregnated with an active agent. The impregnation with the active agent takes place by immersing the granules in a solution of the agent, then by drying them afterwards.

Since the method of manufacturing the two previous types of reactant includes an impregnation step followed by a drying step, it may prove to be long and expensive.

SUMMARY OF THE INVENTION

The subject of the present invention is therefore an active composite which has a laminate structure which offers excellent permeability to a gas flow and has good thermal conductivity properties, but is still easy to produce.

To do this, the invention provides an active composite consisting of a compressed support and of at least one agent that is active with respect to a gas, the compressed support, comprising recompressed expanded graphite having a relative density of between 0.02 and 1.5, being formed by a series of sheets superposed on top of one another, characterized in that the active agent is dispersed between the sheets in the form of granules.

According to a preferred embodiment, the active composite having a laminate structure comprises from 5 to 95% by weight of recompressed expanded graphite and from 95 to 5% by weight of active agent.

The invention also provides a method of implementing solid-gas or solid-liquid physico-chemical processes, this method being characterized in that it uses as reaction medium an active composite consisting of a compressed support and of an agent that is active with respect to a gas, the compressed support comprising recompressed expanded graphite having a relative density of between 0.02 and 1.5, being formed by a series of sheets superposed on top of one another, the active agent being dispersed between the sheets in the form of granules.

An active composite of this type is intended to be used for carrying out either a reaction of the solid-gas type, or an adsorption between a gas and a solid, or a reaction catalysed by a solid between a gas and a liquid, or the condensation/evaporation of a gas, or finally a solid-catalysed gas transformation reaction. Thus, the present invention provides a method of carrying out either reactions of the gas-solid type, or gas-solid absorption reactions, or finally catalytic transformation reactions of a gas using as reaction medium a block of active composite according to the invention.

The active composite according to the invention must have a very high anisotropy in terms of heat transfer, which will result from the ordered compression of the highly thermally conductive graphite sheets, while still maintaining a high porosity allowing good diffusion of the gas to each active site, the active sites being located substantially uniformly within the composite.

The active composite according to the invention, the relative density of the graphite in which is between 0.02 and 1.5, has a high thermal conductivity anisotropy, that is to say that the thermal conductivity $C_1$ along a first direction $D_1$ in the active composite is markedly greater than that obtained along another direction $D_2$ in the composite, perpendicular to the first. The active composite according to the invention has an anisotropy coefficient, which is the ratio $C_1/C_2$, of between 2 and 200 and preferably between 10 and 100, wherein $C_1$ is the thermal conductivity along a first direction $D_1$ and $C_2$ is the thermal conductivity on another direction $D_2$.

Moreover, the active composite according to the invention must have a high porosity allowing the gases to reach the active sites.

According to one aspect of the invention, the active composite comprises a stack of similar sheets, combined in pairs so that in each pair the two faces provided with granules are in contact with each other. Thus, a passage is created between two sheets of a pair which makes the granules readily accessible to a gas.

According to alternative forms of the invention, in order further to increase the accessibility of the active sites to the liquids and gases:

at least one layer of highly porous material is placed between two adjacent layers of active agent;

and/or passing through the compressed support are diffusion holes, of various cross-sections, which cross the plane of the sheets;

and/or passing through the face of the sheets of the compressed support is a network of diffusion channels, it being possible for the network to be etched or moulded in particular.

The said highly porous material is advantageously a woven fabric, a mat or a paper of carbonaceous material, glass or any other material resistant to the gas or liquid and resistant to the temperatures reached during implementation of the said physico-chemical processes.

According to another alternative form of the invention, so as in particular to vary the thermal conductivity in the plane of the sheets and therefore to adjust the heat flow, the said sheets have slots and/or notches and/or grooves, which may or may not pass through the thickness of the said sheets and are of various lengths and various shapes, such as circular arcs.

Other characteristics and advantages of the present invention will become clearer on reading the following description, which is given with reference to the appended drawings.

BRIEF DESCRIPTION OF THE FIGURES OF DRAWINGS

FIGS. 1 to 5 are each a diagrammatic view in longitudinal section of an active composite having a laminate structure according to the invention.

DETAILED DESCRIPTION OF THE PREFERRED EMBODIMENT

Figure 1:
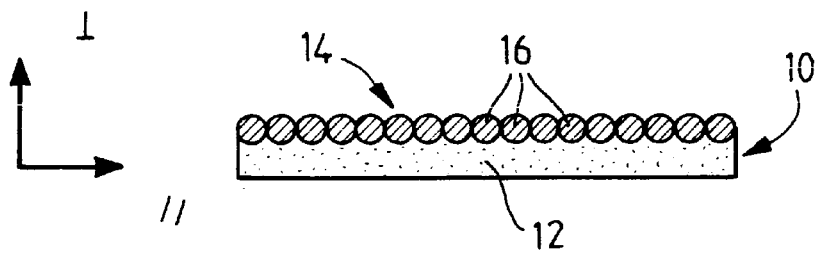

The active composite according to the invention is intended to be formed by superposing several similar sheets, one of which is shown in FIG. 1.

The sheet 10 comprises a support 12 produced from expanded graphite in powder form, this graphite being compressed, for example by a press in a mould or by a prerolling facility. The compression may be carried out in several steps, the density of the graphite of the sheet produced increasing at each step. Preferably, the final density of the graphite of the sheet is between 0.02 and 1.5 g/cm$^3$.

Figure 2:
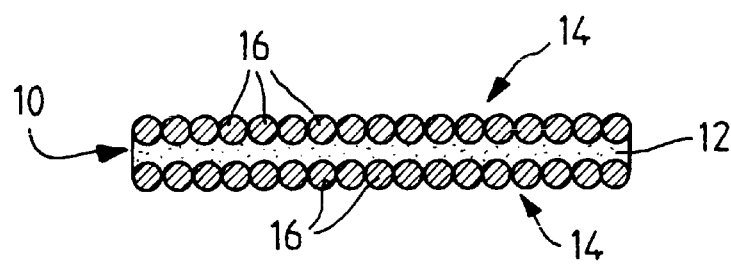

Once the support 12 has been produced, the active agent 14, in the form of granules 16, is placed on at least one face of the support 12. The granules 16 are then rendered integral with the support 12 either just by compression or by adhesive bonding, a layer of adhesive having been placed on the support beforehand, followed by compression. It is also possible to place the granules 16 of active agent on both sides of the support 12, as shown in FIG. 2.

After having formed several similar sheets 10, either by preparing them separately or by producing a continuous web which is subsequently cut into similar portions, the sheets 10 may be superposed so as to form an active composite.

Figure 3:
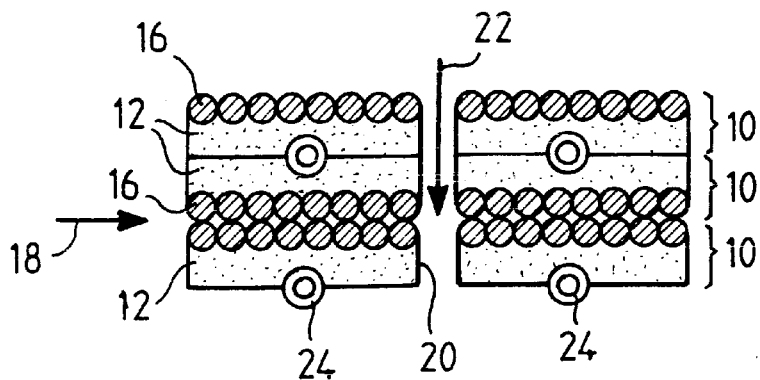

FIG. 3 shows an active composite formed by several sheets 10, each provided with active agent on only one of their sides. The sheets 10 are superposed so that the faces provided with active agent, of two adjacent sheets, lie together. Thus, when carrying out a reaction between the active agent and a gas, the gas can flow, in the direction of the arrow 18, between the granules 16 of the active agent. Ducts 20 perpendicular to the sheets, intended to allow passage of the gas in the direction of the arrow 22, may advantageously be formed in the active composite.

Since the sheets of the active composite are placed in pairs so that two faces provided with granules, of two consecutive sheets, are in contact with each other, the porosity of the composite is that of the granules. This results in the creation of preferential channels for the gas to flow through the composite.

Figure 4:
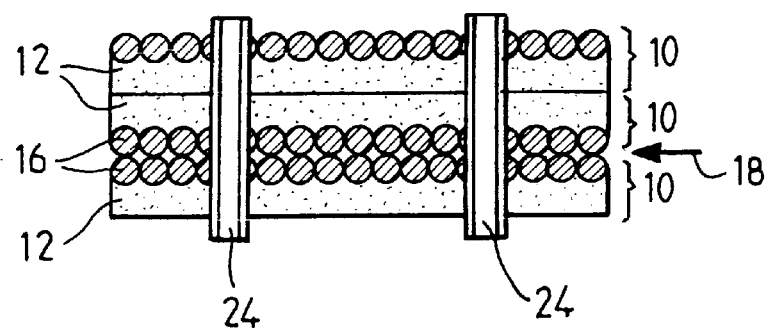

The active composite is provided with heat-transfer tubes 24 which are in intimate contact with the supports 12 and intended to receive a heat-transfer fluid capable of exchanging heat with the composite via the graphite of the compressed support. In addition, electrical resistance elements may advantageously be placed in the composite. Alternatively, the heat-transfer tubes 24 may cross several sheets 10, as shown in FIG. 4.

Alternatively, instead of providing heat-transfer tubes placed transversely, heat exchangers, in the form of plates, may be placed parallel to the sheets inside the active composite. Preferably, each exchanger lies between two faces of consecutive sheets which are devoid of granules.

Good contact between the active composite and the heat-exchange devices may be achieved:

by compression moulding of the exchange devices during the production of the active composite;

when making up the stack of sheets, by placing the exchangers so that they are in contact with the supports and then by compressing the stack consisting both of the sheets and the exchangers; and if the exchangers are shell-and-tube exchangers, after making up the stack, by press-fitting the tubes into the stack or by any known means which makes it possible to increase the diameter of a tube after it has been fitted (belling-out, deformation under pressure, etc.).

This good thermal contact may be improved by any means involving the use of a third substance, such as conductive adhesives or pastes.

As the material is in the form of sheets which can be very easily machined using a water jet or any other means, it is possible to use this advantage to produce active composites and arrays of heat- or gas-exchange devices of complex shapes.

The placing of the granules 16 on the surface of a support 10 may be very easily controlled. In particular, it is possible to mask certain regions of the support using any known means (paper mask, self-adhesive, etc.) so as to prevent the granules from coming into contact with the support during the step of pressing the bed of granules onto the support. In this way, all that is required is to remove the mask in order to reveal, marked on the surface of the support 10, a grid pattern, without any granules 16, corresponding to the geometry of the mask.

The superposable-sheet structure of the active composite makes it possible to envisage a composition or characteristics of the stack which vary depending on the height. In particular, it will be conceivable to produce a stack of plates:

- with granules of zeolite, for example, alternating with sheets based on activated carbon;
- with amounts of granules per plate which may vary from sheet to sheet;
- with thermal conductivities which may vary from sheet to sheet;
- with permeabilities which may vary from sheet to sheet; and
- with a heat flux which may vary from sheet to sheet, for example by varying the number of heat-transfer tubes.

Figure 5:
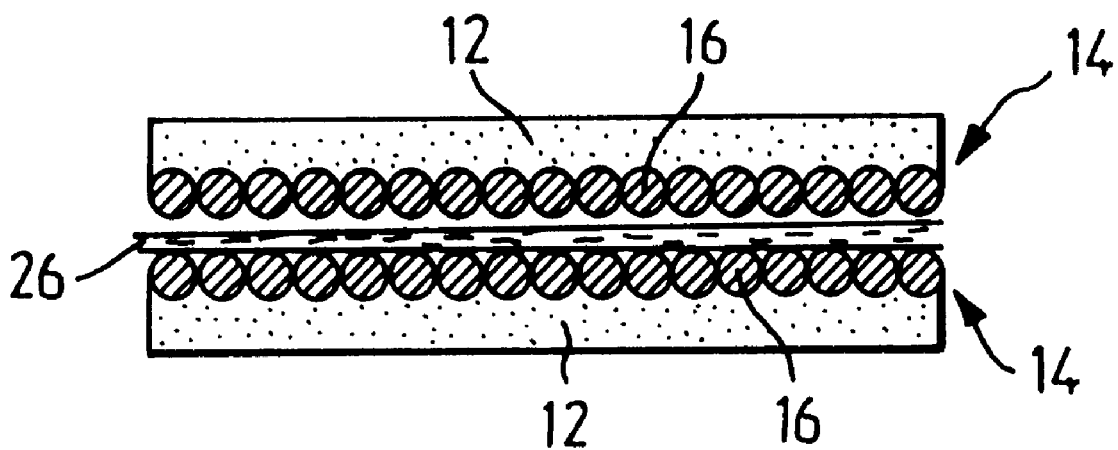

In an alternative embodiment shown in FIG. 5, at least one layer of highly porous material 26 is placed between two adjacent layers of active agent 14 formed by granules 16 on support 12.

EXAMPLE

In order to check the technical performance characteristics of the active composite according to the invention, three materials are produced and these are then tested in the same reactor chamber. The active agent in each of the three composites was zeolite, this being the site of an adsorption reaction with water vapour.

Material M1 is a bed of zeolite granules 2 mm in diameter poured into the reactor.

Material M2, produced according to Patent WO91/15292, is a zeolite (5 $\mu$m<diam.<100 $\mu$m) and expanded-graphite powder mixture in the following mass proportions: 70 zeolite/30 graphite.

Next, the homogenous mixture was compressed to obtain a cylinder 150 mm in diameter and 100 mm in height, the density of graphite dG of which was 0.2 g/cm$^3$.

Material M3 according to the invention is a stack of sheets, each sheet being produced by the following sequence of operations:

- creation of a monolayer of 2 mm-diameter zeolite granules;
- manufacture of a support by compressing expanded graphite, of initial density $dg_{init}$=0.05 g/cm$^3$;
- spray-coating the support with adhesive;
- pressing the support onto the bed of zeolite granules until the thickness of the sheet is such that dG=0.2 g/cm$^3$ (idem M2). A monolayer sheet with a zeolite content of 70% and dG=0.2 g/cm$^3$ is therefore obtained;
- and finally, using a water jet, discs 150 mm in diameter are cut and stacked in the reactor to a height of 100 mm.

After measuring the characteristics of the 3 materials in the axial direction, or perpendicular to the plane of the plates of active composite (suffix $\perp$), and in the radial direction, or parallel to the plane of the composite plates (suffix //), the following results are obtained:

|  | $\lambda_{//}$ (Wm$^{-1}$K$^{-1}$) | $\lambda_\perp$ (Wm$^{-1}$K$^{-1}$) | $K_{//}$ (m$^2$) | $K_\perp$ (m$^2$) |
| --- | --- | --- | --- | --- |
| Material M1 | 0.1 | 0.1 | 10$^{-9}$ | 10$^{-9}$ |
| Material M2 | 7 | 2 to 3 | 4 to 8 × 10$^{-13}$ | 1 to 7 × 10$^{-14}$ |
| Material M3 | 15 | 0.1 | 10$^{-9}$ | 10$^{-16}$ |

Material M1 has an adsorption capacity limited by its low thermal conductivity, the heat-up blocking the adsorption reaction.

The performance characteristics, in terms of capacity, of material M2 are improved because of the gain in thermal conductivity by a factor of 70, but its low permeability limits this gain in capacity.

Material M3 according to the invention provides an increase in conductivity by a factor of 150 over M1, whilst still maintaining the same non-limiting permeability. A direct consequence is a gain in capacity by a factor at least equal to 20. Furthermore, the thermal conductivity anisotropy given by the ratio $\lambda_{//}/\lambda_\perp$ (1 for M1, 2.3 to 3.5 for M2, 150 for M3) may be advantageously used for designing more efficient reactors as described in heat-front systems.

The active composite having a laminate structure according to the invention can be produced from many different active agents such as those proposed, for example, in Table I. Active agent is understood to mean, for example, a reactive solid, an absorbent solid or a solid acting as a catalyst.

TABLE I

| Nature of the active-agent/gas interaction | Active agents | Gas |
| --- | --- | --- |
| (Reversible) solid-gas reactions | Halides<br>Pseudohalides<br>Carbonates<br>Sulphates<br>Nitrates<br>Oxides<br><br>Metals<br>Metal alloys<br><br>Metal hydrides | Water<br>NH$_3$ and derivatives<br>(amines)<br><br>CO$_2$<br>SO$_2$<br>SO$_3$<br>O$_2$<br>H$_2$<br>Hydrocarbons<br>H$_2$ |
| (Reversible) solid-gas adsorption | Zeolite<br>Activated carbon<br>Silica gel<br>Phosphoric oxide | Water<br>Methanol and derivatives<br>Ammonia |
| Heterogeneous catalysis | Ni + C$_6$H$_6$ | H$_2$ |
| Gas separation | Zeolite<br>Activated carbon<br>Silica gel<br>Phosphoric oxide | Examples:<br>Air<br>Hydrocarbons<br>Volatile organic composites |

Since a block of active composite is formed from sheets superposed on top of one another, it is possible to prepare various types of blocks depending on their intended application. In the simplest case, a block of active composite is produced from sheets having the same density, each sheet having the same active agent in the same proportions. The block thus produced has a homogeneous structure.

It is also possible, in order to produce the block of active composite, to use sheets having different densities, for example so as to create a block whose density increases or decreases gradually through its thickness. This type of block can be produced from sheets of different densities, each having the same active agent, either in the same proportions or in proportions which vary depending on the density of the sheets.

In addition, by placing various active agents on the sheets, preferably one active agent per sheet, it is possible to construct active composites having various active agents in certain regions, and in predetermined proportions. This type of composite may advantageously be produced from sheets of different densities.

Thus, according to the invention, varied types of active composite may be produced, in which the density of the sheets, the nature of the active agent and its proportions in the block may be easily selected.

The active composite according to the invention thus exhibits superior performance characteristics given that it has a greater mechanical integrity (small variation in the volume occupied by the reactant) and thus makes it possible to obtain coefficients for heat exchange at the wall which do not limit the method.

We claim:

1. Active composite laminate having high anisotropy and high porosity comprising sheets comprised of:
   a support comprised of compressed expanded graphite having a density between 0.02 and 1.5 g/cm$^3$ and
   granules of at least one agent which is active with respect to a gas dispersed on at least one face of the support;
   said sheets being superposed on top of one another such that the granules on the face of a sheet are in contact with the granules on the face of an adjacent sheet, to form the laminate.

2. Active composite according to claim 1, wherein the granules are rendered integral with the support.

3. Active composite according to claim 2, wherein the granules are rendered integral with the support by adhesive bonding.

4. Active composite according to claim 1, further comprising a stack of similar sheets, combined in pairs so that in each pair the two faces provided with granules are in contact with each other.

5. Active composite according to claim 1, comprising sheets having a thickness of between 0.1 mm and 10 mm.

6. Active composite according to claim 1, comprising from 5 to 95% by weight of compressed expanded graphite and from 95 to 5% by weight of active agent.

7. Active composite according to claim 1, having a thermal conductivity anisotropy whose coefficient $C_1/C_2$ is between 2 and 200.

8. Active composite according to claim 1, wherein the sheets have the same density.

9. Active composite according to claim 1, wherein the sheets have different densities.

10. Active composite according to claim 1, wherein different active agents are dispersed on respective sheets.

11. Active composite according to claim 1, wherein the active agent is dispersed in the sheets in different proportions.

12. Active composite according to claim 1, wherein at least one layer of highly porous material is placed between the sheets.

13. Active composite according to claim 12, wherein the said highly porous material is chosen from a woven fabric, a mat or a paper of carbonaceous material, glass or any other material resistant to the gas or liquid and resistant to the temperatures reached during implementation of physico-chemical processes.

14. Active composite according to claim 1, wherein passing through said composite are diffusion holes, of various cross-sections, which cross the plane of the sheets.

15. Active composite according to claim 1, wherein passing through the sheets is a network of diffusion channels.

16. Active composite according to claim 1, wherein the sheets have slots and/or notches and/or grooves therein.

* * * * *